UNITED STATES PATENT OFFICE.

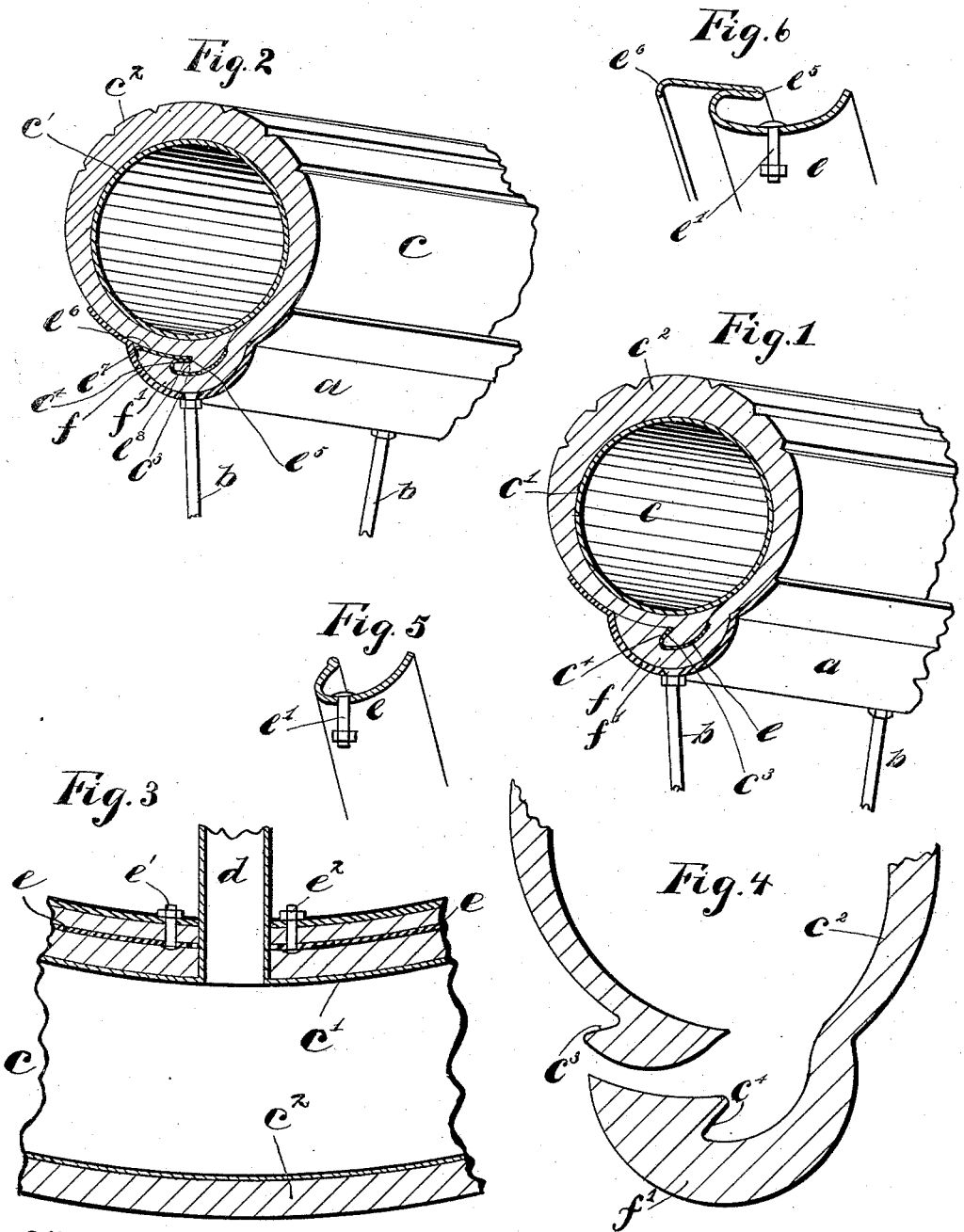

HARVEY BROWN, OF BRANDT, OHIO.

PNEUMATIC TIRE.

SPECIFICATION forming part of Letters Patent No. 468,721, dated February 9, 1892.

Application filed December 11, 1891. Serial No. 414,669. (No model.)

*To all whom it may concern:*

Be it known that I, HARVEY BROWN, a citizen of the United States, residing at Brandt, in the county of Miami and State of Ohio, have invented certain new and useful Improvements in Pneumatic Tires, of which the following is a specification.

My invention relates to improvements in pneumatic tires for bicycles and similar vehicles, and it also relates in its nature to improvements on the devices set forth in my pending application, Serial No. 408,416, filed October 12, 1891.

The object of my invention is to provide improved means for securing the tire in position on the wheel-rim in such a manner that it may be removed or replaced, and, further, to provide detachable means for holding the outer tire or covering in such a manner that the expanding tube may be readily accessible for repairs or otherwise. I attain these objects by the constructions shown in the accompanying drawings, in which—

Figure 1 is a sectional view of a portion of a vehicle-tire embodying my invention. Fig. 2 is a similar view showing a slight modification in the engaging or interlocking parts. Fig. 3 is a longitudinal sectional view of a portion of the same, taken at the point where the air is supplied to the inner expansible tube. Fig. 4 is a detail view of the overlapping or interlocking edges. Fig. 5 is a detail view, partly in section, showing the inner clamping plate or ring for securing the tire to the wheel-rim. Fig. 6 is a similar view of the modified form of ring or clamping-plate employed in the modification shown in Fig. 2.

Like parts are represented by similar letters of reference in the several views.

In the said drawings, $a$ represents the rim or felly of a velocipede or other vehicle wheel; $b$, the spokes of the same. $c$ is the tire, formed, essentially, of an inner expansible tube $c'$ of rubber and an outer non-expansible covering $c^2$ of rubber and canvas or other flexible material, which shall form a flexible cover for the inner expansible tube $c'$, the material of the outer covering being of such construction as not to be easily cut or punctured. The inner expansible tube $c'$ is an endless tube extending entirely around the vehicle-rim within the covering $c^2$ and having a single opening through which an air-inlet $d$ penetrates. The outer covering $c^2$ is divided on one side and is provided with interlocking edges $c^3$ $c^4$, adapted to engage and interlock, so as to hold the respective parts of the covering firmly united, the interlocking edges being preferably arranged at a point centrally within the rim or felly.

To provide for securing the outer covering $c^2$ to the wheel-rim so that it shall be securely fastened thereto and yet permit the interlocking parts to be removed, so that access may be had to the inner expansible tube $c'$, and, further, to provide for stiffening or strengthening the interlocking parts, I employ a clamping-plate $e$, preferably formed in cross-section to correspond with the shape of that side or edge of the divided covering which may be termed the "permanently-connected" side or edge. This clamping-plate is preferably made in the form of a ring, which extends entirely around the wheel-rim, except that it is divided at the point through which the air-inlet enters, the said clamping-ring being firmly secured at the ends by clamping screws or bolts $e'$ $e^2$, which pass through said plate, outer covering, and wheel-rim, as shown. If preferred, the plate may be made in sections and clamping-screws be employed at suitable intervals throughout the entire circumference of the wheel rim or felly.

To provide for more securely holding the tire in the rim, and, further, to improve and strengthen the connection between the interlocking parts, I preferably form the wheel rim or felly with a central trough-shaped cavity $f$, preferably formed on the arc of a circle of smaller radius than that of the rim proper. That portion or edge of the tire which I have termed the "stationary" or "permanently-connected" edge I form with a rounded portion $f'$ to correspond and fit into said trough-shaped recess of the rim or felly. By this construction the stationarily-connected edge of the tire is held against lateral movement by the trough-shaped recess, and when clamped therein by means of the clamping ring or plate is securely fastened against any accidental displacement. The construction also brings the interlocking parts entirely within the wheel-rim and preferably within the outer periphery or the arc representing the outer periphery of the same.

In Fig. 2 I have shown a modification in the interlocking parts. In this case the clamping-plate $e$ is provided with a forwardly-extending lip $e^5$, formed by bending the metal forward and thence backward upon itself, so as to produce an extension $e^6$, adapted to rest against the side of the trough-shaped recess $f$, as shown at $e^7$, thus forming a brace for said plate, the extending lip $e^5$ being adapted to engage in a corresponding opening $e^8$ in the interlocking edge $e^3$.

In the operation of the device the stationary or permanently-connected edge of the outer covering is connected to the wheel-rim by the clamping plate and screws, as described. The covering is then placed in its position around the expansible tube and the interlocking parts placed in engagement, after which the inner expansible tube is expanded by forcing air through the tube $d$, thus dilating the covering and causing the interlocking parts to bind firmly together and the inner portion of the tire to hug closely to the rim proper.

Having thus described my invention, I claim—

1. In a tire for vehicles, an inner expansible tube and an outer flexible non-expansible cover, the cover being adapted to completely surround the inner expansible tube and provided with interlocking edges, one of said edges being permanently connected to the wheel-rim by a clamping-plate, as described, substantially as specified.

2. In a tire for vehicles, an inner expansible tube and an outer non-expansible divided cover, a removable clamping-plate for permanently securing one edge of said divided cover to the wheel-rim, and an engaging projection on the other edge adapted to engage with the permanently-connected edge and thus lock the parts together, substantially as specified.

3. The combination, with an inner expansible tube and an outer non-expansible divided cover, a wheel-rim having a trough-shaped recess, one edge of said outer cover being formed to correspond to said trough-shaped recess and firmly secured therein, the opposite edge of said cover being provided with an engaging projection adapted to interlock with the permanently-secured edge, substantially as specified.

4. The combination, with a metallic wheel-rim, of a tire formed with an inner expansible tube and an outer non-expansible divided cover, interlocking projections on the respective edges of said divided cover, and a clamping-plate adapted to firmly secure one edge of said cover to the wheel-rim, said clamping-plate being formed with a projection to strengthen the interlocking parts, substantially as specified.

5. The combination, with a wheel-rim and a tire formed of an inner expansible tube and an outer non-expansible divided cover, of a clamping ring or plate formed with an engaging projection and adapted to secure one edge of said divided cover to the wheel-rim, and an engaging projection on the opposite edge of said cover adapted to engage with said plate, substantially as specified.

6. The combination, with a wheel-rim formed with a central recess and a tire consisting, essentially, of an inner expansible tube and an outer non-expansible divided cover, of a clamping-plate for securing one edge of said cover in said recess, an engaging projection on said clamping-plate having an extension which rests in contact with the wheel-rim, and an interlocking projection on the opposite edge of said divided cover to engage with said clamping-plate, substantially as specified.

7. The combination, with a wheel-rim having a central trough-shaped recess, of a tire composed of an inner expansible tube and an outer non-expansible divided cover, the respective edges of said cover being provided with interlocking projections adapted to engage and hold said cover in place when the inner tube is expanded, said engaging projections being located wholly within said trough-shaped recess, substantially as specified.

8. In a tire for vehicles, an inner expansible tube and an outer non-expansible cover, said cover being adapted to surround the inner expansible tube and provided with interlocking edges, substantially as specified.

In testimony whereof I have hereunto set my hand this 8th day of December, A. D. 1891.

HARVEY BROWN.

Witnesses:
HANY F. NOLAN,
S. B. KELLY.